United States Patent
Kobiki et al.

(10) Patent No.: US 8,488,879 B2
(45) Date of Patent: Jul. 16, 2013

(54) IMAGE PROCESSING DEVICE AND IMAGE PROCESSING METHOD

(75) Inventors: Hisashi Kobiki, Kanagawa-ken (JP); Yasutoyo Takeyama, Kanagawa-ken (JP); Ryosuke Nonaka, Kanagawa-ken (JP); Masahiro Baba, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 13/410,627

(22) Filed: Mar. 2, 2012

(65) Prior Publication Data

US 2013/0071018 A1    Mar. 21, 2013

(30) Foreign Application Priority Data

Sep. 16, 2011  (JP) .................................. 2011-203830

(51) Int. Cl.
  *G06K 9/00*   (2006.01)
  *G06K 9/46*   (2006.01)
  *G06K 9/34*   (2006.01)

(52) U.S. Cl.
  USPC .......................................... 382/165; 382/190

(58) Field of Classification Search
  USPC .......... 382/162, 164, 165, 167, 190; 358/515, 358/518, 520, 523, 530; 356/243.4, 243.5, 356/402–425, 940, 943; 351/200, 205; 345/419, 345/420, 426
  See application file for complete search history.

(56) References Cited

U.S. PATENT DOCUMENTS

| | | | | |
|---|---|---|---|---|
| 5,528,431 A | * | 6/1996 | Wilkins | 359/885 |
| 6,618,050 B1 | * | 9/2003 | Rupieper et al. | 345/426 |
| 6,926,407 B2 | * | 8/2005 | Simpson | 351/205 |
| 7,034,942 B2 | * | 4/2006 | Gudaitis et al. | 356/419 |

OTHER PUBLICATIONS

Higo, et al. Realtime Removal of Specular Reflection Component Based on Dichromatic Reflection Model, Computer Vision and Image Media, vol. 93, pp. 211-218, 2006.
Shafer. Using Color to Separate Reflection Components, Color Research and Application, vol. 10, No. 4, pp. 210-218, 1985.

* cited by examiner

*Primary Examiner* — Amir Alavi
(74) *Attorney, Agent, or Firm* — Turocy & Watson, LLP (57) ABSTRACT

An image processing device includes a hue calculation unit configured to calculate a hue of a pixel included in a target image; an extraction unit configured to extract a first group including a pixel, a hue of which is close to a hue of the target pixel; a chromaticity calculation unit configured to calculate a chromaticity of the pixel included in the first group and that of the target pixel; a diffuse reflection factor calculation unit configured to calculate an estimated diffuse reflection factor by using the chromaticity of the pixel included in the first group and that of the target pixel; and a separation unit configured to separate a diffuse reflection component from a pixel value of the target pixel by using the diffuse reflection factor, the diffuse reflection component representing a component in the pixel value that varies as the diffuse reflection factor varies.

19 Claims, 8 Drawing Sheets

IMAGE PROCESSING DEVICE AND IMAGE PROCESSING METHOD

CROSS-REFERENCE TO RELATED APPLICATIONS

This application is based upon and claims the benefit of priority from the prior Japanese Patent Application No. 2011-203830, filed on Sep. 16, 2011, the entire contents of which are incorporated herein by reference.

FIELD

Embodiments described herein generally relate to an image processing device and an image processing method.

BACKGROUND

There has been a requirement for a technique to separate an input image into a specular reflection component and a diffuse reflection component. For example, in the field of object recognition with a robot vision, a technique has been studied which enhances the recognition accuracy by acquiring the reflection characteristics of an object's glossy surface. In contrast, there is a technique in which pixels are extracted by means of the hue of an object in an image, and a diffuse reflection factor, which describes the actual color component of the surface, is estimated from the extracted pixels. There is disclosed a technique in which, by using the estimated diffuse reflection factor to separate the color that is changeable by the illumination, the diffuse reflection component and specular reflection component of the target pixel are separated from each other. However, in a case where a noise is added to the pixel value of the processing target pixel, the hue of the observed pixel may greatly deviate from its true value. For this reason, in a case of Non-patent reference, mentioned below, in which a fixed threshold is used to distinguish hues from one another, deterioration occurs in the accuracy of the extraction of a pixel which is included in a surface having the same diffuse reflection factor as the processing target pixel. Such deterioration eventually deteriorates the accuracy of the separation of the diffuse reflection component.

The related art of contents of which are incorporated herein by reference, which are described in Higo et al. (2006), "Real-time Removal of Specular Reflection Component Based on Dichromatic Reflection Model," Information Society of Japan—Computer Vision and Image Media (CVIM), pp. 211-218.

DETAILED DESCRIPTION

In view of the above circumstances, an aspect of embodiments provides an image processing device including a hue calculation unit configured to calculate a hue of a pixel included in a target image; an extraction unit configured to extract a first group including a pixel, a hue of which is close to a hue of the target pixel; a chromaticity calculation unit configured to calculate a chromaticity of the pixel included in the first group and that of the target pixel; a diffuse reflection factor calculation unit configured to calculate an estimated diffuse reflection factor by using the chromaticity of the pixel included in the first group and that of the target pixel; and a separation unit configured to separate a diffuse reflection component from a pixel value of the target pixel by using the diffuse reflection factor, the diffuse reflection component representing a component in the pixel value that varies as the diffuse reflection factor varies.

According to an aspect of embodiments, a method for separating a diffuse reflection component of a target pixel without being affected by a noise in an image can be provided.

[Description of Embodiments]

Hereinbelow, image processing devices of embodiments will be described in detail with reference to the drawings. In this section, portions that the same across the embodiments are denoted by common reference signs, and their overlapping descriptions are omitted.

(First Embodiment)

(1) Image Processing Device 10

Figure 1:
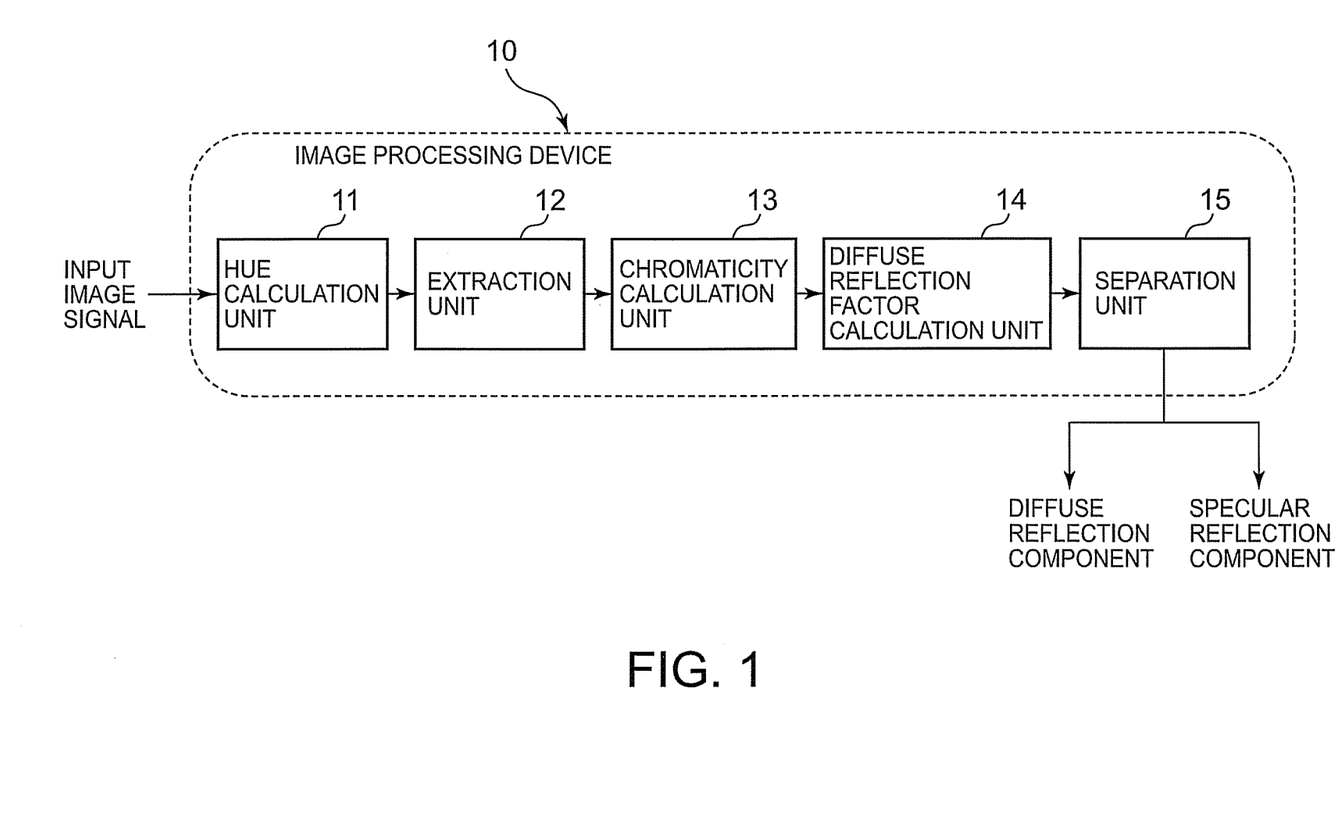
FIG. 1 is a block diagram showing an image processing device 10 of a first embodiment.

FIG. 1 is a block diagram of an image processing device 10 of a first embodiment.

The image processing device 10 includes a hue calculation unit 11, an extraction unit 12, a chromaticity calculation unit 13, a diffuse reflection factor calculation unit 14, and a separation unit 15.

Input image signals include a pixel value of each pixel. Each pixel value is an image signal containing a luminance signal and a color signal that are based on a standard of the International Telecommunication Union (hereinafter, referred to as ITU), for example. The pixel value can be based on any of a scheme which uses three primary colors of R, G, and B as components, and a scheme which converts RGB into a luminance signal and a color difference signal. As an example, this embodiment will be described by assuming a scheme which uses RGB corresponding to the three primary colors in a standard, ITU-RBT.601, as components. Accordingly, the pixel value of each pixel in the input image are expressed with R, G, and B channels having the luminances of red, green, and blue components, respectively. The R, G, and B channels have sets of discrete pixel value of 0 to $r_o$, 0 to $g_o$, and 0 to $b_o$, respectively.

Reflected light from an object (imaging subject) is reflected in two physically different paths. In one path, the light is reflected at the boundary at the surface of the object, and this reflection refers to specular reflection. In the other path, the light incident on asperities on the surface of the object is reflected in a diffuse manner, and this reflection refers to diffuse reflection. In the diffuse reflection, the reflected color is different from the direction of the light source and is unique to the surface of the object.

The hue calculation unit 11 calculates the hue of each pixel included in the input image signals and sends the calculated hue to the extraction unit 12. Hue is one of the properties of color and describes a difference in tint such as the difference between red and yellow. Details will be described later.

The extraction unit 12 sets a criterion on the basis of the pixel value of the target pixel and extracts a first group including pixels having hues that are closer to the hue of the target pixel than the criterion is. The extraction unit 12 sends information on each pixel extracted as the first group to the chromaticity calculation unit 13.

The chromaticity calculation unit 13 calculates the chromaticity of each pixel included in the first group and that of the target pixel and sends the calculated chromaticities to the diffuse reflection factor calculation unit 14.

The diffuse reflection factor calculation unit 14 calculates the diffuse reflection factor of the target pixel that represents the actual color of the object by using the chromaticity of the target pixel and that of each pixel included in the first group, and sends the calculated diffuse reflection factor to the separation unit 15.

By using the diffuse reflection factor of the target pixel, the separation unit 15 separates a color component of the target pixel that is changeable by the diffuse reflection factor (hereinafter, referred to as diffuse reflection component) and a color component of the target pixel that is changeable by the specular reflection of the light of the illumination (hereinafter, referred to as specular reflection component), and outputs the separated color components. Note that although this embodiment describes a configuration In which both of the diffuse reflection component and the specular reflection component are figured out and outputted, the configuration maybe such that only one of the components is outputted.

Figure 2:
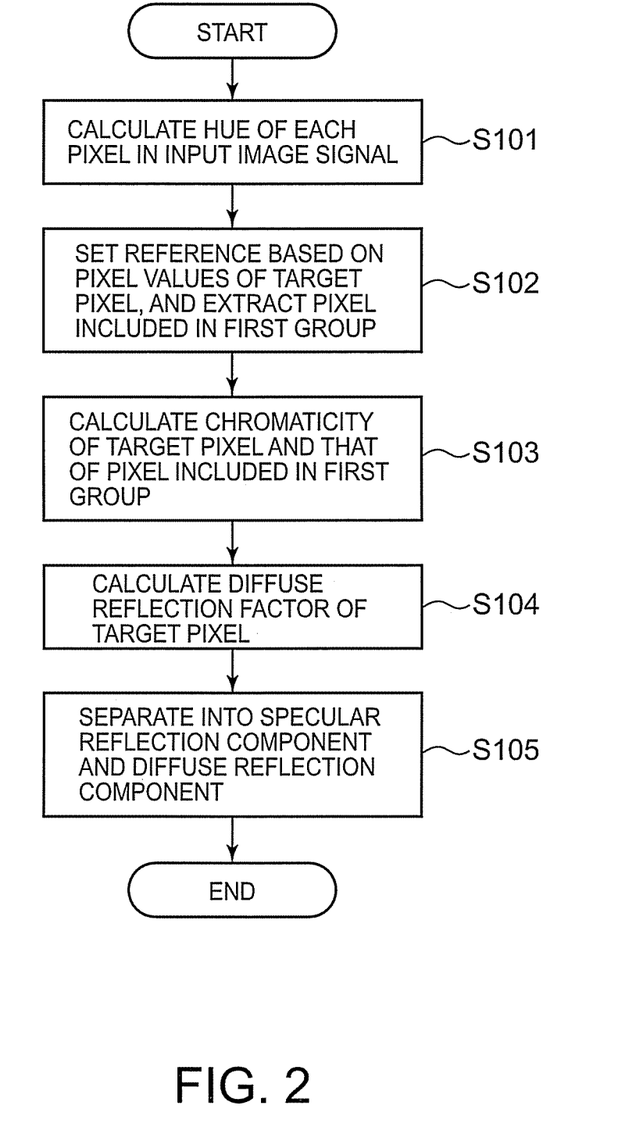
FIG. 2 is a flowchart showing an operation performed in the first embodiment.

Next, an operation of the image processing device 10 will be described with reference to FIG. 2. Together with this description, each unit of the image processing device 10 will be described.

(2) Hue Calculation Unit 11

The hue calculation unit 11 calculates the hue of each pixel included in input image signals and sends the calculated hue to the extraction unit 12 (S101).

As the hue in this embodiment, it is desirable to calculate a hue in an RGB color space corresponding to the three primary colors in a standard, ITU-RBT.709. This is because BT.709 is the most common standard in displaying images on liquid crystal displays and plasma displays, and many of signals transmitted as input images exist within this RGB space. Here, the space within which the hue is calculated may be any color space as long as it is a color space capable of conversion from the RGB color space. Specifically, the hue may be calculated within a common space such as XYZ color space, Yxy color space, Lab color space, or HIS color space. A formula for calculating a hue h in the RGB color space is shown below as an example.

$$h=180 \times a\tan((r/(r+g+b))/(g/(r+g+b)))$$ Formula 1, where r, g, and b represent the pixel value of each pixel, respectively, and a tan represents an arc tangent function. h takes a continuous value within a range running from −180 to 180.

(3) Extraction Unit 12

The extraction unit 12 sets a criterion on the basis of the pixel value of the target pixel and extracts the first group including pixels having hues closer to the hue of the target pixel than the criterion is (S102). In this embodiment, as the criterion, a hue threshold is set which varies depending on the pixel value of the target pixel. The extraction unit 1 extracts pixels having hues equal to or below the threshold and included in the first group as a first pixel group and sends it to the chromaticity calculation unit 13.

Figure 3:
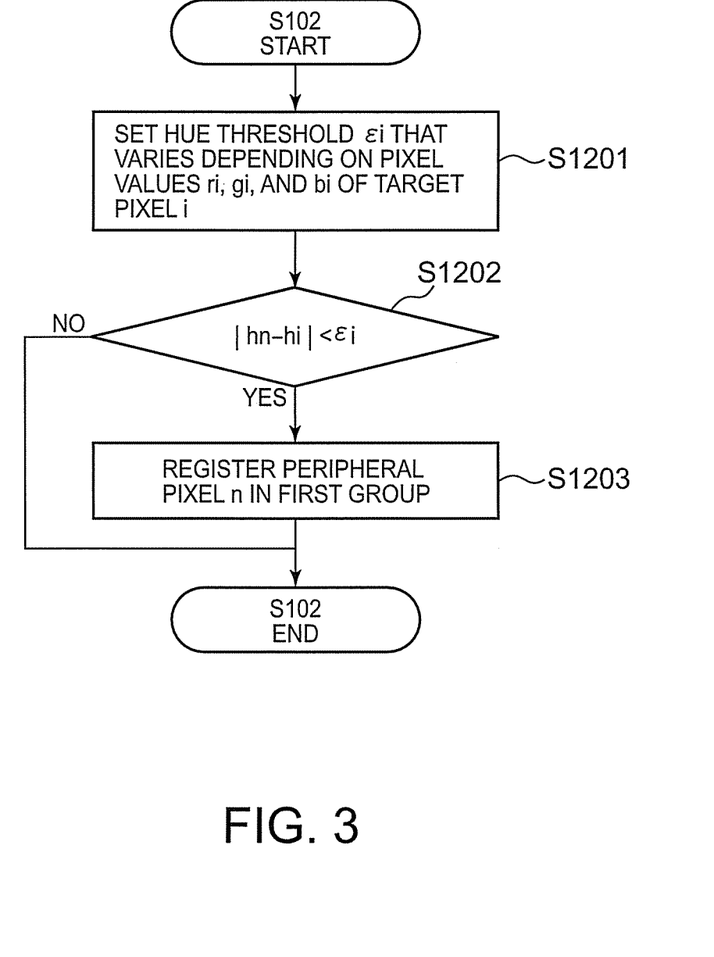
FIG. 3 is a flowchart showing an operation of an extraction unit 12 of the first embodiment.

FIG. 3 is a diagram describing details of the operation of the extraction unit 12 performed in S102.

A threshold $\epsilon i$ is set which varies depending on the pixel value ri, gi, and bi of the target pixel i (S1201). In this step, $\epsilon i$ is set by the following formula.

$$\epsilon i = c \times \sigma i(ri, gi, bi)$$ Formula 2, where ri, gi, and bi are the pixel value of the target pixel i, respectively, and c is a constant equal to or above 0.

σi is a value that varies depending on the pixel value of the target pixel. For example, suppose a pixel in which ri is extremely high and gi and bi are extremely low. In this case, even when random noises with the same strength are added to all the channels, respectively, the deviation from the true hue (red) is extremely small. In contrast, suppose a pixel in which ri, gi, and bi are substantially equal to each other but ri is slightly higher than gi and bi. In this case, when random noises with the same strength are added to all the channels, the hue of the pixel contaminated by the noises appears green or blue even though the true hue is in fact red. Hence, the deviation from the true hue (red) is extremely large. For this reason, σi is desirably set based on the pixel value ri, gi, and bi of the target pixel i. In this embodiment, σ is desirably held in advance for all the possible combinations of the pixel value r, g, and b. This is because calculating and holding a in advance can reduce the number of times computation is performed, and therefore reduce the processing cost. Moreover, it is possible to approximate σi from the correlation mentioned above. Furthermore, it is possible to find the threshold for each set of pixel value and store them in association with each other in advance.

It is judged for each of the pixels n whether or not the difference between the hue hi of the target pixel i and the hue hn of the pixel n is equal to or below $\epsilon i$ (S1202), the pixels n being included in the input image and located on the periphery of the target pixel i. As the peripheral pixels, pixels are extracted which are located inside an area of M pixels×M pixels having the target pixel i at the center, for example. In a case of Yes in S1202, the peripheral pixel n is registered in the first pixel group (S1203).

In general, the the surface color of an object is determined by the diffuse reflection factor unique to the surface. Here, surfaces having the same diffuse reflection factor have the same hue. Thus, using hue allows the extraction of a pixel which is assumed as having captured light reflected from a material with a surface having the same diffuse reflection factor as the target pixel.

However, it is found that when a noise is added to the pixel value, the calculated hue deviates from the actual hue of the surface color of the object. Such deviation increases the likelihood of failure in the extraction of a pixel belonging to a surface of a material that is in fact the same as that of the target pixel. In this embodiment, even when a noise is added to the pixel value, causing the hue to deviate greatly from its true value, processing is performed to select a hue threshold that is adjusted to the degree of the deviation caused by the noise. Accordingly, the first pixel group relative to the target pixel can be extracted accurately.

In the first embodiment of the invention, the first group is extracted from the periphery on the target pixel as a pixel on the same surface as that of the target pixel. In general, surfaces of an object that belong to the same area are continuous with each other and exist in locations close to each other in terms of space. Surfaces that belong to different areas may have the accidentally same hue but often exist in locations that are far from each other in terms of space. Thus, according to this embodiment, it is possible to exclude a surface that has the same hue as the target pixel but belongs to a different area, and extract the pixel value of truly the same surface only.

(4) Chromaticity Calculation Unit 13

The chromaticity calculation unit 13 calculates the chromaticity of the target pixel and that of each pixel in the first pixel group by using the pixel value of these pixels and sends the calculated chromaticities to the diffuse reflection factor calculation unit 14 (S103). In this embodiment, the chromaticity D (dr, dg) of the target pixel and that of the pixel in the first pixel group are calculated from formulas 3 to 6 below.

$$D(dr, dg) \quad \text{Formula 3,}$$

$$dr = r/(r+g+b) \quad \text{Formula 4,}$$

$$dg = g/(r+g+b) \quad \text{Formula 5,}$$

$$db = 1 - dr - dg \quad \text{Formula 6,}$$

where r, g, and b are the pixel value of the pixel, respectively, and dr, dg, and db are normalized strengths of the red, green, and blue components of the pixel, respectively. db can be calculated from dr and dg. In other words, the chromaticity D is transmitted as information obtained by normalization of the balance between the pixel value r, g, and b of the channels of the pixel and, thereafter, projection thereof onto the r-g plane. Note that the chromaticity D may be calculated by means of Yxy chromaticity or Yuv chromaticity instead of the one described above, as long as the chromaticity has similar properties.

(5) Diffuse Reflection Factor Calculation Unit 14

The diffuse reflection factor calculation unit 14 calculates a diffuse reflection factor representing the actual color component of the target pixel by using the chromaticity of the target pixel and that of each pixel included in the first group, and sends the calculated diffuse reflection factor to the separation unit 15 (S104).

Here, the diffuse reflection factor Di is calculated from a formula 7 below.

$$Di = \Sigma(Dj \times \sqrt{((drj)^2 + (dgj)^2)})/\Sigma(\sqrt{((drj)^2 + (dgj)^2)}), \quad 0 < j \leq n \quad \text{Formula 7,}$$

where Dj represents the chromaticity of the j-th pixel of the n peripheral pixels within the area including the target pixel i, and drj and dgj represents the normalized strengths of the red and green components in the chromaticity of the j-th pixel, respectively. Moreover, the square root of the sum of the squares of drj and dgj represents the density of the color, i.e., the color purity, of the j-th pixel.

Pixels with high purities in the first pixel group are likely to have the actual color component of the surface. For this reason, in this embodiment, weighted averaging of the chromaticities of the pixels is performed based on the color purities of the peripheral pixels as shown in the formula 7. In this way, a diffuse reflection factor representing the actual color component of the target pixel can be obtained. Note that the calculation using weighted averaging is merely an example, and some other method may be employed. For example, the color component of the pixel with the highest color purity in the first pixel group may be obtained as the diffuse reflection factor. Alternatively, a color purity histogram may be generated by using the pixels in the first pixel group, and the diffuse reflection factor may be calculated by using color statistical information such as the highest value, average value, median value, intermediate value, lowest value, or percentile.

(6) Separation Unit 15

The separation unit 15 separates the diffuse reflection component and specular reflection component of the target pixel from each other by using the diffuse reflection factor of the target pixel and outputs the separated components (S105).

There exists a model in which the color of the surface of an object is expressed by the linear sum of the luminance of specular reflection and the luminance of diffuse reflection (hereinafter, referred to as dichromatic reflection model). In this embodiment, based on the dichromatic reflection model, a formula involving the linear sum of the luminance of specular reflection and the luminance of diffuse reflection is derived for each of the pixel value ri, gi, and bi of the target pixel by using the diffuse reflection factor Di. The formula for the channel of each color is shown below.

$$ri = \alpha i \times dri + \beta i \quad \text{Formula 8,}$$

$$gi = \alpha i \times dgi + \beta i \quad \text{Formula 9,}$$

$$bi = \alpha i \times (1 - dri - dgi) + \beta i \quad \text{Formula 10,}$$

where dri, dgi, and (1−dri−dgi) represent the normalized strengths of the red, green, and blue components in the diffuse reflection factor Di, respectively. Moreover, in the right-hand side of each of the formulas 8 to 10, the first term shows the luminance of the diffuse reflection in the dichromatic reflection model, and the second term shows the luminance of the specular reflection in the dichromatic reflection model. $\alpha i$ means a diffuse reflection coefficient, and $\beta i$ means a specular reflection coefficient, and they are unknowns at this point.

Next, simultaneous formulas are solved by using the formulas 8 to 10 to calculate $\alpha i$ and $\beta i$. In this step, dri, dgi, and (1−dri−dgi), which are the normalized strengths of the red, green, and blue components in the diffuse reflection factor Di, have already been found, and the pixel value ri, gi, and bi of the target pixel have already been found as well. Thus, the simultaneous formulas using the formulas 8 to 10 are an overdetermined problem in which the number of formulas is three and the number of unknowns is two. For this reason, it is desirable to find the solution by using an explicit solution technique using the method of least squares. This is because even when a noise is added to the pixel value, an influence of the noise can be removed by using the method of least squares, making it possible to find a more correct solution. The calculated $\alpha i \times Di$ and $\beta i$ are outputted as the diffuse reflection component and specular reflection component of the target pixel i, respectively.

According to this embodiment, the diffuse reflection component and specular reflection component of the target pixel can be separated from each other highly accurately even when a noise is added to the target image. Separating the diffuse reflection component and specular reflection component of the target pixel as described is useful in highly accurate object recognition.

The separated diffuse reflection component and specular reflection component may further be applied to image enhancement. For example, the specular reflection component maybe dilated and thereafter re-combined with the diffuse reflection component. By using the components in this way, it is possible to enhance the glossiness of the surface of the object. Moreover, the specular reflection component may be lowered and thereafter re-combined with the diffuse reflection component. By using the components in this way, it is possible to perform processing to lower the glossiness as in a case of processing a person's face. This embodiment is useful even when used at a stage before enhancement processing as above since the diffuse reflection component and specular reflection component of the target pixel can be separated from each other highly accurately even when a noise is added to the processing target image.

For reasons as described above, this embodiment is effective in general image processing performed in imaging devices such as cameras and sensors, as well as displaying devices such as televisions and displays.

(Second Embodiment)

Hereinbelow, an image processing device 20 of a second embodiment will be described with reference to FIGS. 4 to 8B.

Figure 4:
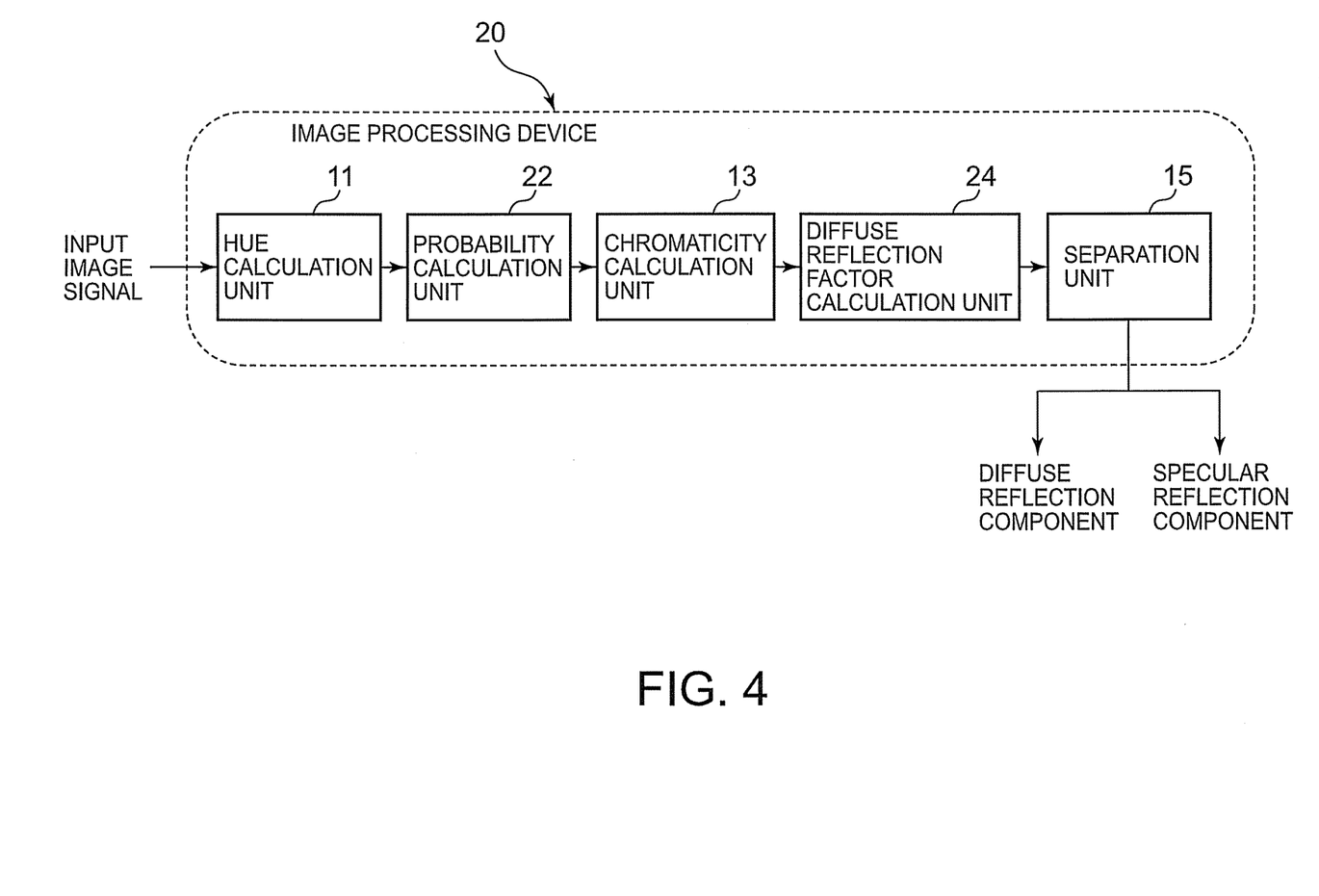
FIG. 4 is a block diagram showing an image processing device 20 of a second embodiment.

FIG. 4 is a block diagram of the image processing device 20 of this embodiment.

The image processing device 20 includes a hue calculation unit 11, a probability calculation unit 22, a chromaticity calculation unit 23, a diffuse reflection factor calculation unit 24, and a separation unit 15.

The probability calculation unit 22 calculates a deviation of the target pixel and a deviation of each of its peripheral pixels by using the pixel value of input image signals. For each peripheral pixel, the probability calculation unit 22 calculates the probability of the peripheral pixel belonging to a surface having the same diffuse reflection factor as the target pixel, by using the deviation and the hue of the target pixel and the deviation and the hue of the peripheral pixel. The probability calculation unit 22 sends the calculated probability to the chromaticity calculation unit 23.

The chromaticity calculation unit 23 calculates the chromaticity of the target pixel and that of each peripheral pixel and sends the calculated chromaticity to the diffuse reflection factor calculation unit 24.

The diffuse reflection factor calculation unit 24 calculates the diffuse reflection factor of the target pixel by performing weighted averaging using the chromaticity of the target pixel and that of each peripheral pixel as well as the probability of the peripheral pixel belonging to the same surface as the target pixel, and sends the calculated diffuse reflection factor to the separation unit 15.

Figure 5:
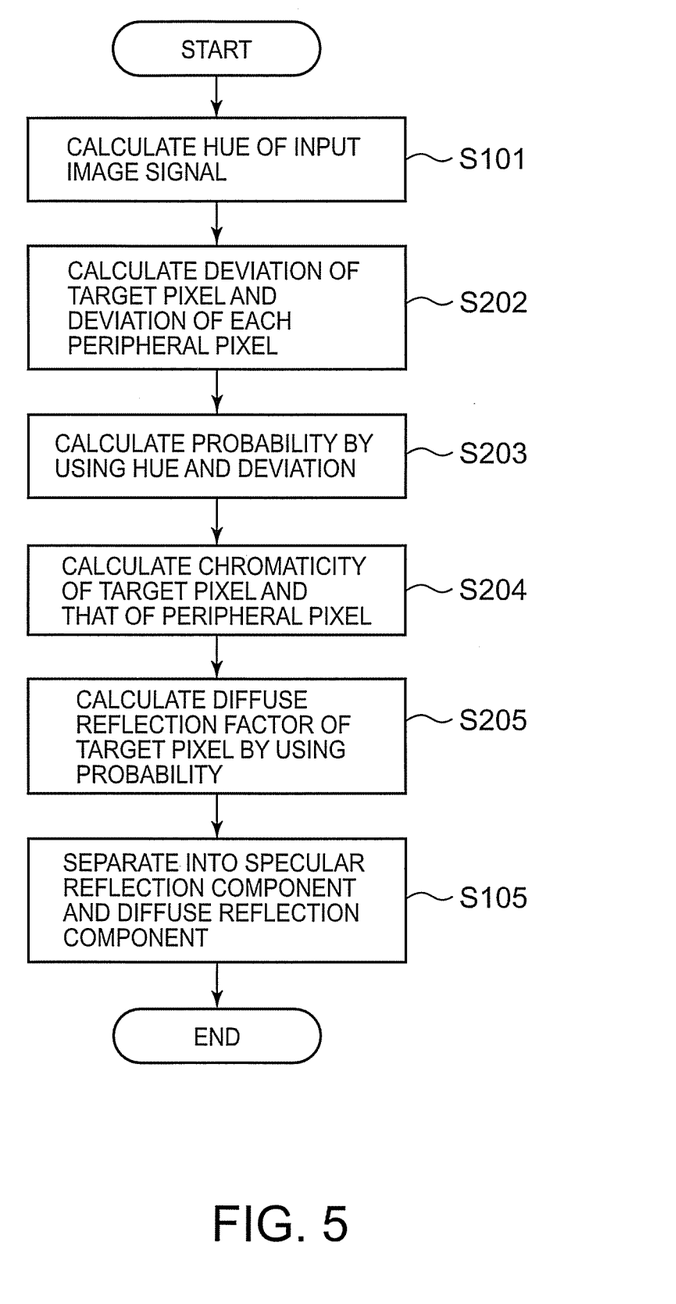
FIG. 5 is a flowchart showing an operation performed in the second embodiment.

Next, an operation of the image processing device 20 will be described in detail with reference to FIG. 5. S101 and S105 include the same operations as those in FIG. 2, and thus detailed descriptions thereof are omitted.

The probability calculation unit 22 calculates the deviation of the target pixel and the deviation of each of its peripheral pixels by using the pixel value of input image signals and sends the calculated deviations to the probability calculation unit 22 (S202).

The image processing device of the first embodiment is configured such that a deviation σ of the hue caused by noise is calculated for all the possible combinations of the pixel value r, g, and b. However, all the possible combinations of the pixel value r, g, and b are as many as 16770000 combinations in a case of 24-bit color, and an extremely large memory size is necessary to hold them in advance. To this end, in this embodiment, the deviation σ of the hue caused by noise is calculated by approximation using the pixel value and hue of the target pixel. In this way, the cost of the memory can be reduced.

As mentioned in the first embodiment, there is a correlation between the size of the deviation σ and the sub-pixel value of the target pixel. Thus, the probability calculation 22 approximates the deviation σ by using a formula 11 below.

$$\sigma = A/(\max(r,g,b) - \min(r,g,b)) + Bf(h) + C \qquad \text{Formula 11,}$$

where A, B, and C are constants equal to or above 0, max( ) is a function to acquire the largest value, min( ) is a function to acquire the smallest value, and f(h) is a function dependent on the hue of the pixel.

Figure 6:
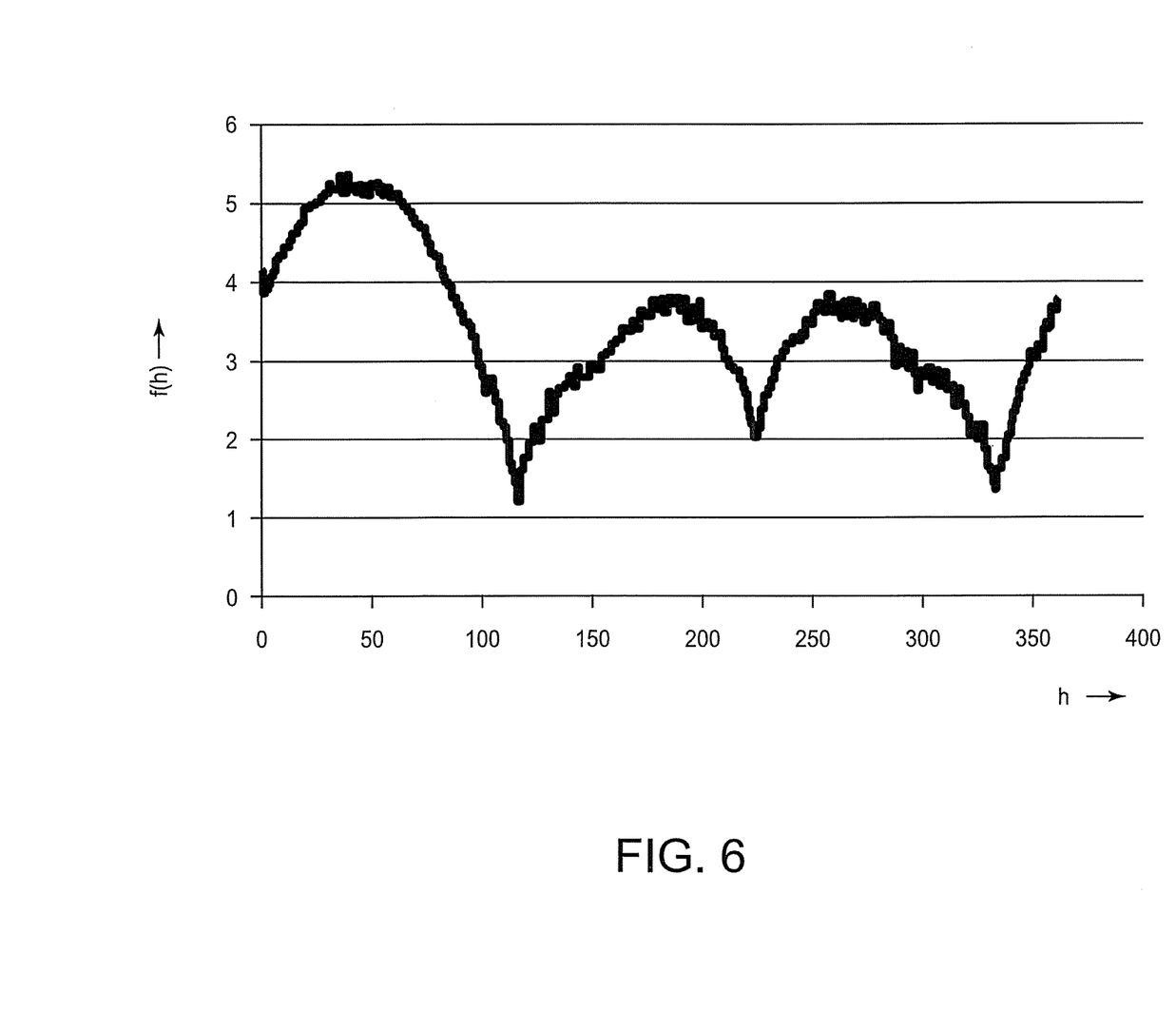
FIG. 6 is an example of an operation of a probability calculation unit 22 of the second embodiment.

The formula 11 is a regression formula derived from a multiple regression analysis on all the deviations σ calculated in the image processing device of the first embodiment, and R^2, a correlation coefficient, is 0.91. Here, the correlation coefficient refers to a statistical index describing the goodness of fit of the regression formula. In general, the reliability of the regression formula is determined high when the correlation coefficient is 0.9 or above. From the first term of the formula 11, a characteristic can be predicted in which the smaller the difference between the largest and smaller values of the sub-pixel value of the target pixel, the larger the deviation σ, and the larger the difference between the largest and smallest value of the pixel value, the smaller the deviation σ. FIG. 6 shows an example of variations in the deviation σ that may be predicted from the function f(h) in the second term, in a case of simulating an environment with a noise that is additive to a signal, such as a Gaussian noise. In FIG. 6, the horizontal axis represents the hue h, and the vertical axis represents f(h). Using f(h) allows the prediction of the deviation σ that varies depending on the hue.

As described above, according to the second embodiment, the deviation σ can be calculated by using a regression formula having a correlation with the deviation σ.

Figure 7:
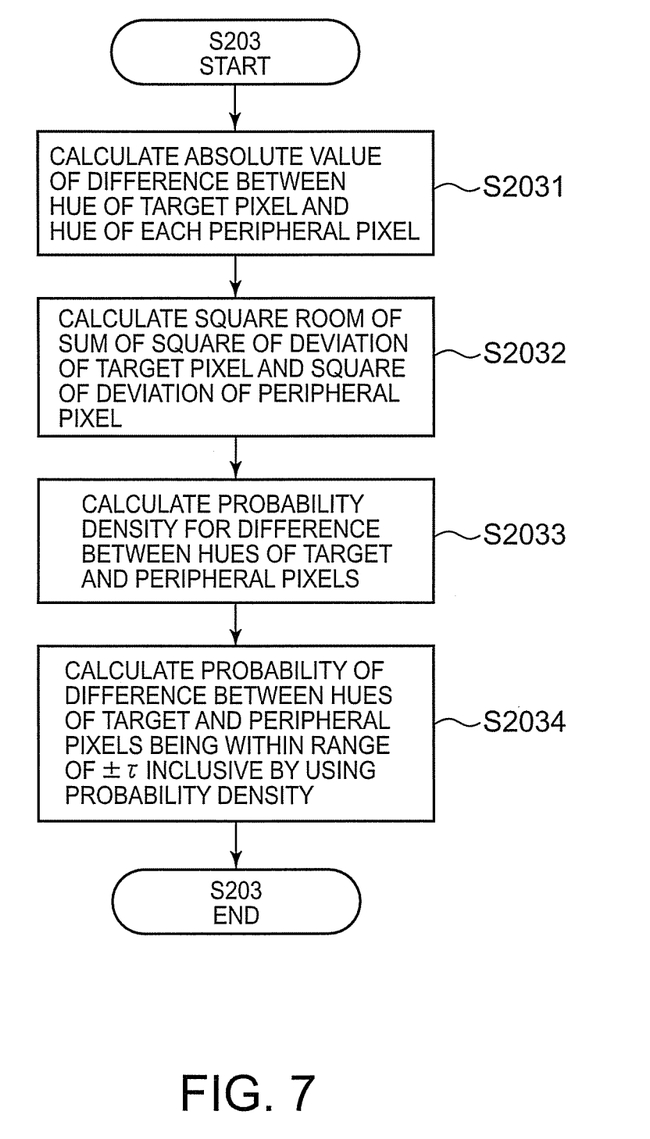
FIG. 7 is a flowchart showing an operation performed in step S203 in the second embodiment.

By using the hue and deviation of the target pixel and the hue and deviation of each peripheral pixel, the probability calculation unit 22 calculates the probability of the peripheral pixel being a surface having the same diffuse reflection factor as the target pixel, and sends the calculated probability to the chromaticity calculation unit 23 (S203). FIG. 7 is a chart describing the operation in S203 in detail.

By using the hue hi of the target pixel and the hue hn of each peripheral pixel n, the probability calculation unit 22 calculates the absolute value of the difference therebetween hc=|hi−hn| (S2031). Then, by using the deviation σi of the target pixel and the deviation σn of the peripheral pixel n, the probability calculation unit 22 calculates the square root of the sum of the squares thereof σc=√(σi²+σn²) (S2032). Then, by using the absolute value hc of the difference and the root square σc of the sum of the squares, the probability calculation unit 22 calculates a probability density pin of the difference between the hues hi and hn of the target and peripheral pixels i and hn being θ (S2033). Then, by using the probability density pin, the probability calculation 22 calculates a probability p (i,n) of the hue difference between the hues hi and hn of the target and peripheral pixels i and hn being within a range of ±τ inclusive (S2034).

Figure 8A:
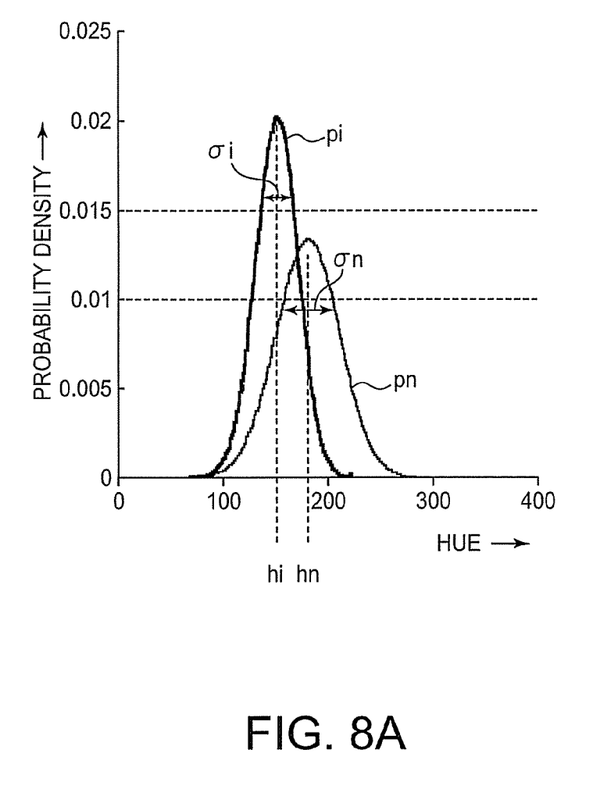
FIGS. 8A and 8B are an example of the operation performed in step S203 in the second embodiment.
Figure 8B:
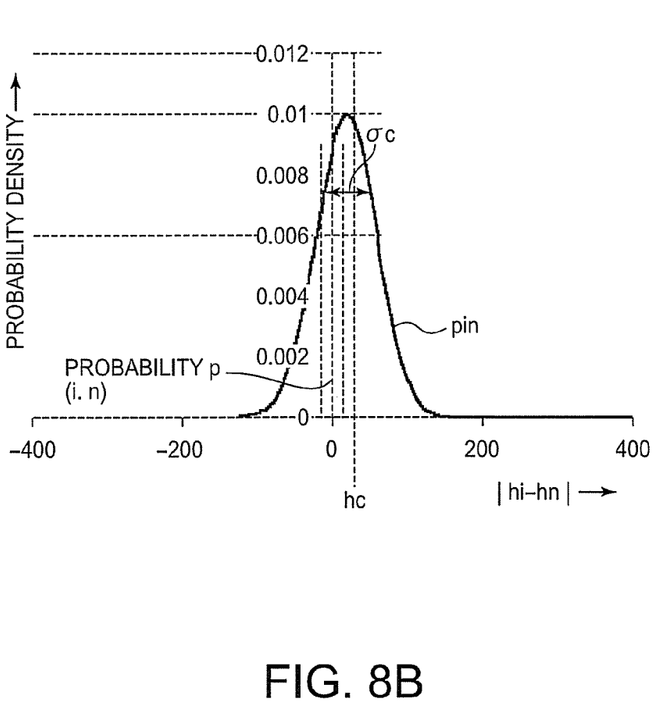

The operations in S2031 to S2034 will be described with reference to FIGS. 8A and 8B. First, the hue hi of the target pixel i is an average value of hues observed after a noise is added and can define a probability density pi which spreads with the deviation σi (FIG. 8A). A probability density pn for the hue hn of the peripheral pixel n can be defined similarly. By using these probability densities, the probability density of the difference between the hues hi and hn of the target and peripheral pixels i and n being θ is found. FIG. 8B shows the probability density pin generated in S2033 by using the absolute value hc of the difference calculated in S2031 and the square root σc of the sum of the squares calculated in S2032. In the graph of FIG. 8B, the horizontal axis represents the angle θ, and the vertical axis represents the probability density of the difference between hi and hn being θ. Here, the probability density pin is calculated from the following formula.

$$pin = 1/(\sqrt{(2 \times \pi)} \times \sigma c) \times \exp(-(hn-hi) \times (hn-hi)/(2 \times \sigma c \times \sigma c)) \qquad \text{Formula 12}$$

In S2034, the interval of −τ<θ<τ in the probability density pin (θ) is integrated to calculate the probability p(i,n) of the difference between the hues hi and hn of the target and peripheral pixels i and n being equal to or below τ. The integration of the above interval is achieved by integrating the angle θ in the hue direction within a finite interval of −τ<0<τ. Here, τ is any constant and is desirably set between −180 and 180. This is because the hue hn of every pixel falls within a range from −180° to +180° centering the hue hi of the target pixel.

As described above, by S2031 to S2034, the probability p(i,n) of n belonging to the same surface as i is calculated. In this process, the probability p(i,n) is set to a continuous value from 0 to 1. Thus, as compared to the first embodiment, the second embodiment can provide an effect allowing quantitative judgment of whether or not n is on the same surface as i.

The chromaticity calculation unit 23 calculates the chromaticity of the target pixel and that of the peripheral pixel and sends the calculated chromaticities to the diffuse reflection factor calculation unit 24 (S204).

(7) Diffuse Reflection Factor Calculation Unit 24

The diffuse reflection factor calculation unit 24 calculates the diffuse reflection factor of the target pixel by weighted averaging using the chromaticity of the target pixel and that of the peripheral pixel as well as the probability of the peripheral pixel belonging to the same surface as the target pixel (S205).

The diffuse reflection factor Di of the target pixel i is calculated from the following formula.

$$Di = \Sigma(Dj \times \sqrt{((drj)^2 + (dgj)^2)} \times p(i,j))/\Sigma(p(i,j)), \ 0 < j \leq n \quad \text{Formula 13,}$$

where Dj represents the chromaticity of the j-th pixel of the n pixels on the periphery of the target pixel i, and drj and dgj represent the normalized strengths of the red and green components in the chromaticity of the j-th pixel, respectively. The square root of the sum of the squares of drj and dgj represents the color purity of the j-th pixel. p(i,j) is the probability of the j-th pixel belonging to the same surface as the target pixel i.

As described above, in S205, the diffuse reflection factor of the target pixel is found by performing weighted averaging using the probability of the peripheral pixel belonging to the same surface as the target pixel. Thus, a large weight can be set to the chromaticity of a pixel having a high probability of belonging to the same surface as the target pixel. Accordingly, an effect is achieved which allows the calculation of the diffuse reflection factor precisely even when a noise is added to the peripheral pixel.

Although some embodiments of the invention are described above, these embodiments are illustrated merely as examples and are not intended to limit the scope of the invention. The embodiments can be carried out in various different forms, and various omissions, replacements, and changes can be made without departing from the gist of the invention. The embodiments and modifications thereof are included in the claims and gist of the invention, and are likewise included in the inventions described in the scope of claims and the scope of equivalents thereof.

What is claimed is:

1. An image processing device comprising:
   a hue calculation unit configured to calculate a hue of a pixel included in a target image;
   an extraction unit configured to extract a first group including a pixel, a hue of which is close to a hue of the target pixel;
   a chromaticity calculation unit configured to calculate a chromaticity of the pixel included in the first group and that of the target pixel;
   a diffuse reflection factor calculation unit configured to calculate an estimated diffuse reflection factor by using the chromaticity of the pixel included in the first group and that of the target pixel; and
   a separation unit configured to separate a diffuse reflection component from a pixel value of the target pixel by using the diffuse reflection factor, the diffuse reflection component representing a component in the pixel value that varies as the diffuse reflection factor varies.

2. The image processing device according to claim 1, wherein the extraction unit configured to set a threshold based on the pixel value of the target pixel included in the target image and to extract the pixel, the hue of which is closer to the hue of the target pixel than the threshold.

3. The image processing device according to claim 2, wherein
   the extraction unit includes a holder for holding in advance a deviation of a hue when a noise is added to an image, and
   the extraction unit calculates the threshold by using the deviation and the pixel value of the target pixel.

4. The image processing device according to claim 3, wherein the extraction unit sets a larger value to the threshold when the deviation corresponding to the pixel value of the target pixel is larger.

5. The image processing device according to claim 2, wherein the extraction unit calculates the threshold on the basis of a hue and a brightness of the pixel value of the target pixel.

6. The image processing device according to claim 2, wherein the extraction unit includes a holder for holding in advance the pixel value and the threshold in association with each other.

7. The image processing device according to claim 1, wherein the separation unit further separates a specular reflection component from the pixel value of the target pixel by using the diffuse reflection factor, the specular reflection component representing a component in the pixel value that varies as a specular reflection factor varies.

8. The image processing device according to claim 1, wherein the diffuse reflection factor calculation unit calculates a color purity of the pixels included in the first group and calculates the diffuse reflection factor by weighted summing in which the chromaticity is weighted more largely for a pixel with a higher color purity.

9. An image processing device comprising:
   a hue calculation unit configured to calculate a hue of a pixel included in a target image;
   a probability calculation unit configure to calculate a deviation of a pixel value of a target pixel included in the target image and that of a pixel value of a peripheral pixel, by using the hue and the deviation of the target pixel and the hue and the deviation of the peripheral pixel, and to calculate a probability of that the peripheral pixel belongs to a first group including a pixel with a hue that is closer to a hue of the target pixel, and said peripheral pixel belongs to a surface having the same diffuse reflection factor as the target pixel;
   a chromaticity calculation unit configured to calculate a chromaticity of the peripheral pixel and the target pixel;
   a diffuse reflection factor calculation unit configured to calculate an estimated diffuse reflection factor by using the probability and the chromaticity of peripheral pixel and the target pixel; and
   a separation unit configured to separate a diffuse reflection component from the pixel value of the target pixel by using the diffuse reflection factor, the diffuse reflection component representing a component in the pixel value that varies as the diffuse reflection factor varies.

10. The image processing device according to claim 9, wherein the separation unit further separates a specular reflection component from the pixel value of the target pixel by using the diffuse reflection factor, the specular reflection component representing a component in the pixel value that varies as a specular reflection factor varies.

11. The image processing device according to claim 9, wherein the diffuse reflection factor calculation unit calculates a color purity of the pixels included in the first group and calculates the diffuse reflection factor by weighted summing in which the chromaticity is weighted more largely for a pixel with a higher color purity.

12. The image processing method comprising:
    calculating a hue of a pixel included in a target image;
    setting a criterion on the basis of a pixel value of a target pixel included in the target image and extracting a first group including a pixel with a hue that is closer to a hue of the target pixel than the criterion;
    calculating a chromaticity of the pixel included in the first group and that of the target pixel;
    calculating an estimated diffuse reflection factor by using the chromaticity of the pixel included in the first group and that of the target pixel; and
    separating a diffuse reflection component from the pixel value of the target pixel by using the diffuse reflection factor, the diffuse reflection component representing a component in the pixel value that varies as the diffuse reflection factor varies.

13. The image processing method according to claim 12, further comprising:
    setting a threshold based on the pixel value of the target pixel included in the target image, and
    extracting the pixel, the hue of which is closer to the hue of the target pixel than the threshold.

14. The image processing method according to claim 13, further comprising:
    holding in advance a deviation of a hue when a noise is added to an image, and
    calculating the threshold by using the deviation and the pixel value of the target pixel.

15. The image processing method according to claim 14, wherein a larger value is set to the threshold when the deviation corresponding to the pixel value of the target pixel is larger.

16. The image processing method according to claim 13, wherein the threshold on the basis of a hue and a brightness of the pixel value of the target pixel is calculated.

17. The image processing method according to claim 13, further comprising:
    holding in advance the pixel value and the threshold in association with each other.

18. The image processing method according to claim 12, wherein a specular reflection component is separated from the pixel value of the target pixel by using the diffuse reflection factor, the specular reflection component representing a component in the pixel value that varies as a specular reflection factor varies.

19. The image processing method according to claim 12, wherein a color purity of the pixels included in the first group is sought and
    the diffuse reflection factor, by weighted summing in which the chromaticity is weighted more largely for a pixel with a higher color purity, is calculated.

* * * * *